March 21, 1944.　　　　H. JOHNSEN　　　　2,344,617
PROCESS FOR THE PRODUCTION OF SALTS BY BASE-EXCHANGING SUBSTANCES
Filed May 26, 1934
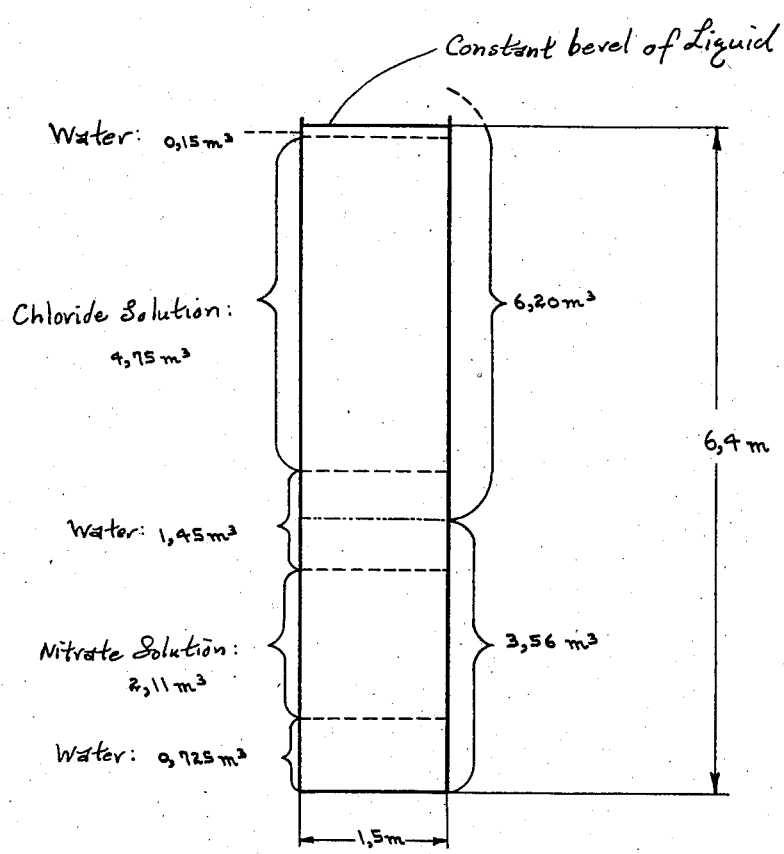
H. Johnsen
INVENTOR
By Marks & Clerk
Attys.

Patented Mar. 21, 1944

2,344,617

UNITED STATES PATENT OFFICE 2,344,617

PROCESS FOR THE PRODUCTION OF SALTS BY BASE-EXCHANGING SUBSTANCES

Henry Johnsen, Notodden, Norway; vested in the Alien Property Custodian

Application May 26, 1934, Serial No. 727,832
In Norway June 22, 1933

14 Claims. (Cl. 23—102)

The present invention relates to a process for the production of salts by means of base-exchanging substances.

It is well known that certain hydrated salts containing silicic acid and alumina or alkali earth bases, especially minerals belonging to the zeolite group, and similar salts produced artificially—the so-called permutites—possess the property of being able to exchange their alkali or alkali earth bases with other bases. This base-exchanging property of the above mentioned substances has been utilized for rendering hard water soft, for freeing drinking water from certain bases and for the purification of salt solutions.

The most important feature of all these processes is that a salt solution or the water that is to be purified, is passed through a base-exchanging substance, for instance permutite composed of grains of a suitable size, whereby an exchange of bases is attained.

It has also been suggested that base-exchanging substances be used for the production of salts, the same principles being used as in the processes by which hard water is rendered soft and by which salt solutions are purified.

Base-exchanging substances for the production of salts have not as yet been employed to any great extent in industry, because, hitherto, only very weak solutions of the required salt have been obtained, and the evaporating costs have consequently been too high.

By means of the present invention this drawback can be remedied, because sufficiently concentrated solutions can be obtained by this process, thus rendering it possible, both technically and economically, to produce salts on a large scale by means of base-exchanging substances.

In order to give the best possible illustration of the process, and as an example of how it can be employed, it will be described in the following how sodium nitrate can be obtained from calcium nitrate and sodium chloride by means of permutite. The word "permutite" may be taken to mean any suitable base-exchanging substance.

To commence with, one has a calcium nitrate and a sodium chloride solution, also permutite saturated with soda salts, in other words, sodium permutite. The permutite must be of a quality through which liquids easily penetrate, and must be composed of grains of a suitable size. It is placed inside a tower that is a few metres high and is deposited on a perforated plate or the like. The major part of the space in the tower is occupied by the permutite, which forms a horizontal surface at the top. In the upper part of the tower there are devices for the liquid supply, and at the bottom there are outlet devices, through which the liquid may be discharged.

When starting the process, the tower is filled with water that is free from air, until it reaches just above the surface of the permutite. The best way of carrying out the first filling process is to press the water slowly through the permutite from below, thus eliminating all air from the permutite.

In order to avoid the formation of air bubbles while the process is in operation, all the liquids supplied to the tower are first rendered free from air to the greatest possible extent, for instance, by placing them under vacuum. Air bubbles have the effect of stopping the activity of the permutite, and causing disturbances in the regular movements of the various layers of liquid (see later). Owing to the fact that vacuum sometimes occurs in certain parts of the tower, air bubbles may be formed, if there is any air at all even in the form of a solution, in any of the liquids that pass through the permutite. From this it will be seen how very important it is that the liquids are free from air. By means of suitable devices care is taken that the level of the liquid remains practically stationary through the entire process, that is to say, just above the surface of the permutite. When the apparatus is in operation, the permutite will thus remain in liquid all the time. For supplying the liquids while the process is in operation, a suitable spraying device is installed in the top of the tower, having several outlets just above the surface of the layer of permutite and evenly distributed above it, but under the level of the above mentioned liquid.

After the tower has been filled with water, a concentrated calcium nitrate solution is supplied through the aforementioned sprayers to the layer of sodium permutite. The solution is evenly distributed over the surface of the permutite and sinks downwards, displacing on its way a corresponding quantity of water, which runs away at the bottom of the tower. During this process, the calcium from the nitrate solution gradually penetrates through the permutite, calcium permutite being formed, whilst sodium in equivalent proportions is forced out of the permutite, sodium nitrate being formed in the solution. It is a characteristic feature of the present process that during the operation thereof an equally large quantity of liquid is discharged from the bottom of the tower as that which is supplied to the permutite at the top of the tower.

At this state in the process there is a nitrate solution on top and clean water just beneath it, and the liquids move gradually downwards through the permutite. When a suitable period has elapsed, the supply of calcium nitrate solution ceases, clean water being supplied through the sprayers instead. After a certain time there will thus be three different layers in direct connection with each other moving downwards through the permutite, viz. first water, then the nitrate solution and finally water. As the nitrate solution now comes continually into contact with sodium permutite that has not been converted, it will gradually become more enriched with sodium nitrate, whilst the quantity of calcium nitrate decreases. After clean water has been supplied at the top of the tower for a brief period, the water is turned off, and a sodium chloride solution is added, this having the effect of regenerating the used permutite. As the regeneration must be as thorough as possible, a considerably larger quantity of this solution is used than of the nitrate solution. The difference in volume becomes still more marked, if a diluted sodium chloride solution is used, for instance sea water, which we have found can be employed for this purpose.

Under the assumption that a sufficiently high tower is used, the following layers of liquid pass through the permutite, counted from the top to the bottom: (1) chloride solution, (2) water, (3) nitrate solution, (4) water.

By degrees, as the layers move through the permutite, the quantities of Ca in the chloride solution and of Na in the nitrate solution increase. After the water has been discharged from the bottom of the tower, the nitrate solution flows down and is collected and evaporated, whereby the sodium nitrate is crystallised out. The mother liquor which chiefly contains calcium nitrate, and to which fresh quantities of calcium nitrate may possibly be added, is re-employed in the process.

The reason why a layer of clean water is inserted between the nitrate solution and the chloride solution is because this prevents the solutions from becoming intermingled. Consequently, the layer of water must be so high that those chlorine ions and nitrate ions that diffuse into the water from each side do not reach the middle of the layer of water by the time it gets to the bottom of the tower. In other words, there must still be some clean water left in the middle of the layer.

When collecting the nitrate solution, it will be possible to prevent any loss of nitrate by collecting at the same time half of the layer of water.

In order to avoid too great a dilution of the nitrate solution, such large quantities of water are not generally employed that complete separation of the nitrate solution and the chloride solution is obtained. The extent to which this is done largely depends upon how pure a quality of salt is required.

The chloride solution, which contains calcium chloride, obtained after the regeneration of the permutite, is also collected separately and evaporated, whereby calcium chloride and sodium chloride are obtained, these being re-employed in the process.

If sea water is used for regeneration purposes, the solution becomes so diluted that it is generally considered worthless and is allowed to run to waste.

When the sodium chloride solution has been supplied to the permutite at the top of the tower for such a long time that the latter has become regenerated, clean water is again turned on, thereupon the nitrate of lime solution, then water, and then again the sodium chloride solution, etc., as described above.

In this manner it is possible, by means of the permutite and a sodium chloride solution, for instance sea water, to convert nitrate of lime into sodium nitrate in a continuous process.

*Example*

A cylindrically shaped tower of an internal diameter of 1.5 metres is filled with permutite placed on a perforated or other permeable plate. The height of the layer of permutite is 6.4 m., and the gross volume thereof is 11.3 cubic metres. When the tower is filled with liquid, which just reaches above the permutite, the volume of the liquid is 80 per cent of the gross volume of the permutite, or—in other words—it is 9.05 cubic metres.

Upon commencing the operation to be described the tower charged with permutite, as described, is filled with water so that it covers the permutite.

Assuming for purposes of description that the permutite at the outset consists of sodium permutite. First, 2.11 cubic metres of calcium nitrate solution containing 52 gr. of $Ca(NO_3)_2$ per 100 cubic cm., that is 1100 kilos of $Ca(NO_3)_2$ in all, is supplied at the top of the tower, and while this is in progress, 2.11 cubic m. of water is discharged from the bottom of the tower.

Immediately the supply of nitrate solution ceases, 1.45 cubic m. of water is supplied at the top of the tower, and directly after that, 4.75 cubic m. of sodium chloride solution containing 26 gr. of NaCl per 100 cubic m., that is 1230 kilos of NaCl in all. Immediately after that, 1.6 cubic m. of water is supplied, then again 2.11 cubic m. of calcium nitrate solution. All the liquids supplied at the top of the tower pass through the permutite at a speed of 5 metres per hour. While passing through the permutite, salt from the solution diffuses into the layers of water. In the present case, the volume of water which was in the tower at the commencement of the experiment was 9.05 cubic m. Had there been no diffusion, 9.05 cubic m. would have been discharged from the bottom of the tower before the first nitrate ions could have been detected in the outlet, and the whole of the nitrate solution would have been contained in the same volume as before, i. e., 2.11 cubic m. which could easily have been collected separately in the form of a nitrate solution.

Instead of allowing 9.05 cubic m. of water to flow away before collecting the nitrate solution, the collection thereof is begun—on account of the diffusion—as soon as 8.325 cubic m. has flown away, that is to say 0.725 cubic m. of the liquid is taken out prior to the original volume of the nitrate solution. Likewise, 0.725 cubic m. is removed after the original volume. In other words, 0.725 cubic m. + 2.11 cubic m. + 0.725 cubic m. is collected, this equaling 3.56 cubic m., in the form of a finished nitrate solution.

The attached diagram shows, schematically, the conditions prevailing in the tower at the moment the collection of the nitrate solution commences.

The collected nitrate solution (3.56 cubic m.) contains 728 kilos of $NaNO_3$, 312 kilos of $Ca(NO_3)_2$ and 7 kilos of NaCl. Thus, about 70 per cent of the quantity of nitrate present in the solution is composed of sodium nitrate. About 5 per cent of the nitrate ions supplied are lost on account of the diffusion.

When evaporating the nitrate solution, about 90 per cent of the sodium nitrate present is obtained by crystallization. The mother liquor is then re-employed in the process as a nitrate charge.

Directly the nitrate solution has been collected, 0.725 cubic m. + 4.75 cubic m. + 0.725 cubic m. equalling 6.2 cubic m. is collected in the form of a chloride solution. From the latter, calcium chloride can be produced. The sodium chloride thereby obtained is re-employed in the process for regeneration of the permutite.

The quantity of water supplied at the top of the tower after the sodium chloride solution may easily be greater than 1.6 cubic m. This is especially advantageous when desiring to produce nitrate that is as free as possible from chloride, because the greater the quantity of water used, the more effective is the washing out of the chloride from the permutite.

When large quantities of water are supplied between the solutions, the middle part of the volume of water that is free from salt is allowed to run to waste, the first and last parts being collected together with the adjoining solutions; by this means it is possible to avoid unnecessary dilution of the solutions.

Instead of only one tower, it is also possible to use two towers or more. This is particularly advantageous when the sodium chloride solution used consists of sea water. In this case, extremely large quantities of sea water are needed for the regeneration process. The process can then be carried out advantageously in the following manner:

The regeneration is effected in one or more towers at a time by conducting sea water through the tower or towers at a speed that is several times as high as that at which the solutions or layers of water respectively pass through other towers, in which the conversion of the $Ca(NO_3)_2$ into $2NaNO_3$ simultaneously takes place.

When using several towers, higher degrees of concentration of the nitrate are attained, provided only the middle, most highly concentrated part of the solution obtained from the tower is collected, the less concentrated parts—coming before and after the middle part—being used as admixtures in the other towers before and after a fresh supply of nitrate solution. By this means, it is possible to avoid any loss of nitrate.

When several towers are employed, the degree of conversion can be heightened by the following method:

The portion of nitrate solution supplied to a tower is made say three times as large as that which is suitable, when only one tower is employed. Only the first, more thoroughly converted part of the solution is collected as a finished solution after conversion has taken place in the tower, whereupon the remainder or a suitable part thereof is conducted to another tower containing newly regenerated permutite. To this tower a concentrated calcium nitrate solution that has not been converted is then immediately supplied.

This can be repeated several times so that from tower No. 2 only the first, more thoroughly converted, part of the solution is collected, the remainder or a suitable part thereof being transferred to tower No. 3, containing newly regenerated permutite, etc. The degree of conversion will thus rise as nearly as possible to the state of equilibrium.

By combining the two last mentioned methods, it is possible for the collected finished nitrate solutions to attain the highest possible degree of concentration and the highest possible degree of conversion.

Contrary to previously known methods, it is not the chief aim of the present process to attain complete conversion by means of the exchange of bases. It has, in fact, been found to be perfectly sufficient for an economic effectuation of the process, if conversion of 60 per cent is acquired.

The permutite is not absolutely insoluble under the conditions described above. A part of it, therefore, becomes lost during the operation of the process. The solubility and consequently the loss is dependent upon the salt content in those liquids which pass through the permutite, and it is therefore the clean water that dissolves the greater part.

It further appears that the silicic acid in the permutite is more easily dissolved than the aluminium oxide, and this applies both when the permutite is in water and when it is in salt solutions.

We have ascertained that the loss of permutite can be reduced practically to nil, if a small quantity of a soluble silicate, for instance sodium silicate, is admixed to the water used in the process. Silicate can also be admixed to the solutions used, provided they do not already contain a sufficient quantity of silicic acid. It is especially advantageous to admix silicate to the sea water used for the regeneration of the permutite in the production of sodium nitrate.

We have found it sufficient, in order to reduce the loss of permutite to a minimum, to admix such a quantity of silicate that the water, and preferably the solutions, too, contains 5–6 mgr. of $SiO_2$ per litre.

As it will be understood, the process described above can be used for a wide range of different salts, provided the salts cannot react with each other, unless base exchanging substances are used. In the example described above, sodium chloride and calcium nitrate are used, which do not generally, that is to say, without the application of base-exchanging substances, react with each other to form sodium nitrate or calcium chloride with such a yield that the process is practicable from a technical point of view.

I claim:

1. A process for the production of soluble salts by means of base-exchanging substance, characterized by the following liquids being passed in the same direction and in successive contact with one another and in the following order through the base-exchanging substance: firstly, a solution of salt containing the same cation as the salt which it is desired to produce and an anion which forms a soluble salt with the exchangeable base of said base-exchanging substance; secondly, a separating body of a solvent of said salt substantially free from impurities which would contaminate the salt being produced; thirdly, a solution of salt containing the same anion as the soluble salt which it is desired to produce and a cation which is exchangeable with said desired cation in said base-exchanging substance; and fourthly, a separating body of a solvent of said second salt substantially free from impurities which would contaminate the salt being produced, and the separating bodies of solvent being thereafter divided, the portions on each side adjacent to the solution of the desired salt being removed together with at least a portion of said solution and treated together therewith for recovery of salt therefrom, and said process being repeated continuously, the base-exchanging substance being covered the whole time by liquid so that it is not exposed to air.

2. The process as defined in claim 1, in which the base-exchanging substance is in a layer less than the height of the total column of the solution having the desired cation passed therethrough to effect regeneration of the base-exchange substance plus the separating body, and while the solution having the desired cation is passing through said base-exchanging substance the rate of flow is increased whereby more quickly to attain regeneration.

3. A process as defined in claim 1 which is further characterized by freeing the wash liquid and the salt solutions from air before they are used in the process.

4. A process as defined in claim 1 which is further characterized by subjecting the liquids before they are used in the process to vacuum whereby to free them from air.

5. The process as defined in claim 1, in which the liquids are passed through zeolite substance comprising a silicate radical and at least one of the liquids when it is passed to the zeolite substance contains a silicate in solution therein.

6. A process as defined in claim 1, in which the liquids are passed through zeolite substance comprising a silicate radical and the wash liquid has a soluble silicate dissolved therein when it is passed to the zeolite substance.

7. A process as defined in claim 1, which is further characterized by the passing of the salt solutions through the base-exchanging substance in a comparatively high layer confined within a tower, separately collecting and recovering the desired salt from only the middle, more highly concentrated part of the salt solution obtained from the tower, conducting the less concentrated parts of the said solution and an adjacent portion of the separating body to another tower, and passing them through a base-exchanging substance therein before and after a more concentrated solution containing the same anion, repeating the process and collecting for recovery of salt therefrom at each cycle a middle part greater than the amount of the more concentrated solution which is added, whereby to offset the amount of liquid added from the separating bodies.

8. A process as defined in claim 1, which is further characterized by the passing of the salt solutions through the base-exchanging substance in a comparatively high layer confined within a tower, collecting, and recovering the desired salt from only the first, more fully converted part of a solution which has passed through the base-exchanging substance, at least a part of the remainder being conducted to another tower containing freshly regenerated base-exchanging substance through which it is conducted immediately before a concentrated salt solution which has not been converted and which contains the same anion.

9. The process as defined in claim 1, which is further characterized by passing an excess of the solution having the desired anion through a base-exchanging substance, separating a part of said solution therefrom which is before the last to pass through the base-exchanging substance and which is more thoroughly converted by the base-exchanging substance than the part which follows it therethrough, recovering the desired salt from said separated part of the solution, and passing at least a part of the remainder of said solution again through freshly regenerated base-exchanging substance.

10. The process as defined in claim 1, in which after a suitable amount of solution containing the desired anion has been passed through the base-exchanging material and suitably converted thereby an additional amount of concentrated solution having the same anion is passed through the same base-exchanging substance to effect partial conversion thereof to the desired salt, and thereafter said partially converted solution is passed through a freshly regenerated base-exchanging substance with further conversion thereof, and more concentrated solution having the desired anion is then passed over the same base-exchanging substance thus repeating the cycle.

11. The process as defined in claim 1, in which the salt in the first named solution having the desired cation is sodium chloride, and the salt in the second named solution having the desired anion is calcium nitrate whereby a solution of sodium nitrate results therefrom.

12. The process as defined in claim 1, in which the first named solution comprises a natural salt solution containing sodium chloride, and the salt in the second named solution having the desired anion is calcium nitrate whereby a solution of sodium nitrate results therefrom.

13. A process as defined in claim 1 in which the successive layers of the solutions and the intermediate liquid separating body form a moving column of liquid and the liquid of each layer is distributed over the area of said layer before it is added to said column, and said layers are moved in substantially smooth flow while in contact with one another so as to avoid intermixing so far as possible.

14. The process for the production by means of a base exchanging substance of a solution of a soluble salt suitable for treatment to recover salt therefrom, characterized by the following liquids being passed in the same direction and in successive contact with one another and in the following order through a base exchanging substance initially containing the desired cation of said salt: first, a separating body of a solvent of the hereinafter described second salt substantially free from impurities which would contaminate the salt being produced; secondly, a solution of salt containing the same anion as the soluble salt which it is desired to produce and a cation which is exchangeable with said desired cation in said base exchanging substance; thirdly, a separating body of a solvent of said salt substantially free from impurities which would contaminate the salt being produced; and fourthly, a solution of a second salt containing the same cation as the salt which it is desired to produce and an anion which forms a soluble salt with the exchangeable base of said base exchanging substance, and the separating bodies of solvent leaving contact with the base exchanging substance being divided, the portions on each side adjacent to the solution of the desired salt being removed with at least a portion of said solution for recovery of salt therefrom, and said process being repeated without the sequence of steps enumerated hereinabove being changed, the base exchanging substance being covered the whole time by liquid so that it is not exposed to the air.

HENRY JOHNSEN.